United States Patent [19]

Ferber et al.

[11] Patent Number: 4,647,199

[45] Date of Patent: Mar. 3, 1987

[54] AUTOMATIC SHUTTER SYSTEM

[75] Inventors: Alan C. Ferber, Hillside, Ill.; Morteza M. Chamran, deceased, late of Elmhurst, Ill., by Delories M. Chamran, legal representative

[73] Assignee: The Perkin-Elmer Corporation, Norwalk, Conn.

[21] Appl. No.: 651,189

[22] Filed: Sep. 14, 1984

[51] Int. Cl.⁴ .............................................. G01J 3/02
[52] U.S. Cl. ................... 356/300; 250/461.1; 356/418; 364/498
[58] Field of Search ............. 250/458.1, 459.1, 461.1, 250/461.2; 356/300, 306, 315–320, 323, 325, 330; 364/498

[56] References Cited

U.S. PATENT DOCUMENTS

| | | | |
|---|---|---|---|
| 3,985,441 | 10/1976 | Schoeffel et al. | 356/325 |
| 4,140,394 | 2/1979 | Roos | 356/306 |
| 4,262,205 | 4/1981 | Abu-Shumays | 250/458.1 |
| 4,291,230 | 9/1985 | Heiss | 250/458.1 |
| 4,310,243 | 1/1982 | Brown et al. | 356/323 |
| 4,319,842 | 3/1982 | Priarone et al. | 356/317 |
| 4,455,097 | 6/1984 | Ichikawa et al. | 356/323 |

FOREIGN PATENT DOCUMENTS 0140580 10/1979 Japan .................................. 356/330

OTHER PUBLICATIONS

Wood et al., *American Laboratory*, V. 11, N. 3, Mar., 1979, pp. 16–29.
Ratzlaff et al., *Anal. Chem.*, V. 50, N. 13, Nov. 1978, pp. 1799–1804.

Primary Examiner—F. L. Evans
Attorney, Agent, or Firm—Ronald G. Cummings; Francis L. Masselle; Edwin T. Grimes

[57] ABSTRACT

A software controlled automatic shutter is described which minimizes ultraviolet irradiation damage to optical components from a high intensity spectrophotometric light source. The shutter automatically opens when measurements are being made and closes when the photometer system is idle. The digital control system may be self contained so as to avoid complication of the main computer.

11 Claims, 2 Drawing Figures

4,647,199

AUTOMATIC SHUTTER SYSTEM

This invention relates to spectrophotometers and, more particularly, to an automatic shutter system for a spectrophotometer.

BACKGROUND OF THE INVENTION

Generation of characteristic fluorescence in a sample solution undergoing analysis requires the solution to be irradiated with a high intensity light beam of selected wavelength, often in the ultraviolet. The source for this beam is typically a monochromator using a high intensity source such as an Xenon arc. However, the high radiation level, which is necessary for the high measurement resolution desired, when it is in the near ultraviolet below 300 nm tends to deteriorate the optical elements in the pre-slit condensing system of the exciting monochromator. In a relatively short time, typically a few hundred hours, the reflectivity of the mirrors drops off drastically, especially in the ultraviolet, with the formation of scattering films on their surfaces where the optical beam strikes. Also, some types of optical filters, if used, tend to solarize or lose their optical UV transmission. These problems further extend to the collimating mirrors and grating of the monochromator. In addition, heat build-up at the entrance slit and in the monochromator may cause wavelength shift and band-width errors.

The interposition of a manually operated shutter between the source and the optical system is a remedy that has been used for many years. However, manually operated shutters are unsuited to modern automatic computer controlled instrumentation which may be called upon to operate unattended for hours.

On the other hand, the obvious idea of including commands in the computer programming routines for opening and closing the shutter at specific times calls for an awkward and often impractical degree of program complexity. Many operating procedures such as establishment of photometric base level are similar to measurement procedures but require the shutter to be locked open or closed. Our invention improves the programming sequence by separating the shutter control from the user selected operating routines thereby providing for opening the shutter only when a signal of activity is received from the instrument's photometer circuit and for closing at a fixed time interval thereafter. This time interval is selected to be long enough to span the usual period of a photometric measurement.

Therefore it is an objective of the invention to provide a protective shutter to isolate the light source of a fluorescent spectrophotometer for optics which could be damaged by excessive extended irradiation.

It is a further object to automatically operate said shutter to open when the instrument activity calls for light from said source.

It is another object to have said shutter automatically close after sufficient time to allow normal activity procedures to be completed.

As a further object complication of instrument routines is avoided by separating the control routine of shutter open period from timing programs of the instrument measuring system.

A further object is to maintain the shutter open if the instrument measurement activity is still continuing when the shutter would normally close.

These objects, as well as provision for locking the shutter open or closed at operator command, are to be accomplished with a minimum program load on the computer so that computer time is not lost from other routines.

BRIEF DESCRIPTION OF THE INVENTION

Although any of a variety of mechanical configurations for the shutter may be used, the presently preferred embodiment has a mechanical shutter means comprising a stepper motor mounted with its shaft vertical and a metal vane projecting horizontally from the shaft of sufficient area to occlude the beam from the Xenon arc source. The stepper motor responds to a series of pulses from a counter, the number of pulses being correct to rotate the shaft through a sufficient angle, for instance 90°, to sweep the vane into or out of the light beam so as to block or pass the beam entirely. When not in motion excitation is removed from the motor leaving it to hold its position by self detenting action, thereby avoiding motor heating.

The pulse string may be generated from the computer microprocessor or from a separate counter. When the instrument is turned on the microcomputer is initialized and a special timer is set to monitor the activity of the spectrophotometer. This generates a signal which may be derived from the photometric circuit. The shutter opens and the timer is started. As long as the instrument is active the shutter remains open, and the timer is reset and restarted each time it comes to the end of its preselected period, typically about two minutes. If activity is found to have stopped at the end of any timing period the shutter will close and remain closed until a new activity signal is received.

There has thus been outlined rather broadly the more important features of the invention in order that the detailed description thereof that follows may be better understood and in order that the present contribution to the art may be better appreciated. There are, of course, additional features of the invention that will be described more fully hereinafter. Those skilled in the art will appreciate that the conception on which this disclosure is based may readily be utilized as the basis of the designing of other apparatus for carrying out the various purposes of the invention. It is important, therefore, that this disclosure be regarded as including such equivalent apparatus as do not depart from the spirit and scope of the invention.

One embodiment of the invention has been chosen for purposes of illustration and description, and is shown in the accompanying drawings forming a part of the specification.

DETAILED DESCRIPTION OF THE PREFERRED EMBODIMENT

Figure 1:
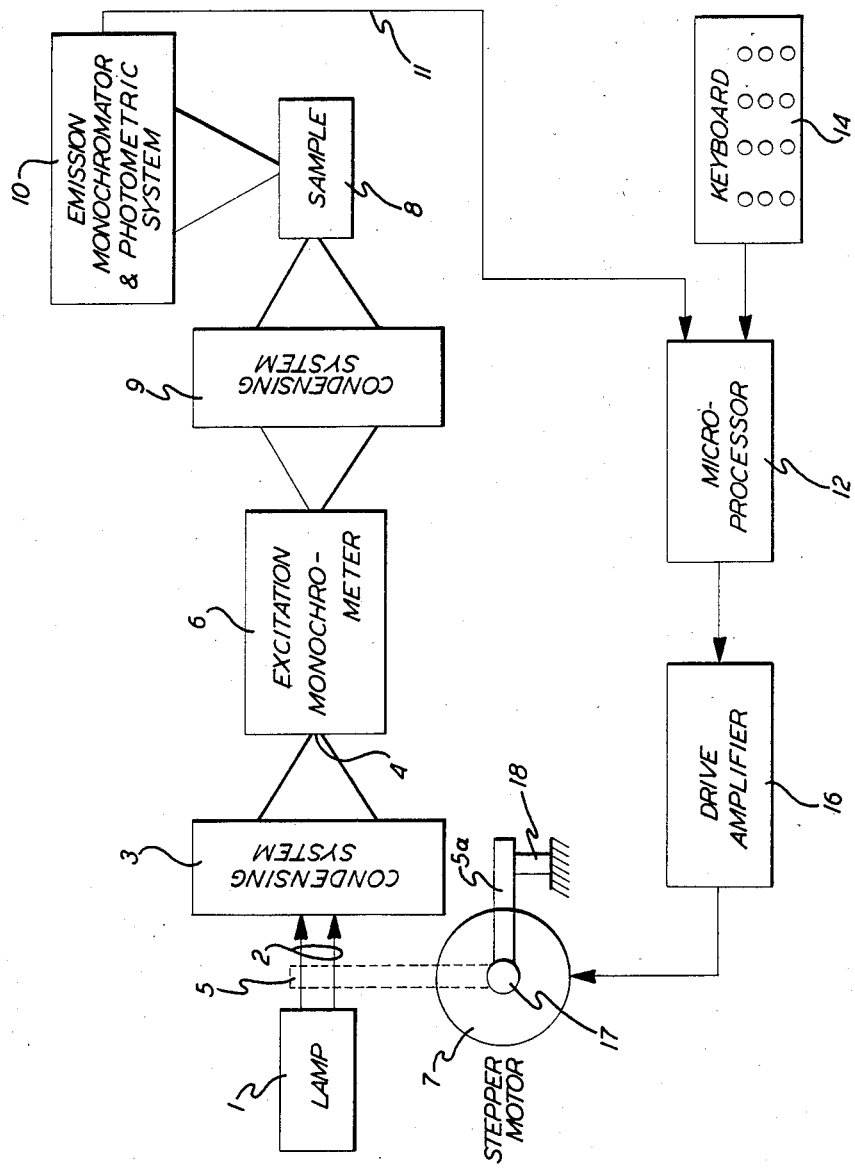
FIG. 1 is a simplified schematic diagram of the shutter and its control circuit.

Referring to FIG. 1 which shows a simplified schematic diagram of the shutter and its relationship to the optical system of the fluoresence spectrophotometer, a Xenon arc lamp 1 is used as a light source. This source may typically be a Type VIX 150UV Illuminator made by ILC Technology, but the invention is not limited to this particular source. The light beam 2 from this source is directed to a condensing system 3 comprising a group of mirrors and other optical components arranged in any of the many configurations employed in the art whose function is to concentrate the output of the source on the entrance slit 4 of the excitation monochromator 6. The shutter 5, here shown as our preferred embodiment, is a light metal or ceramic vane attached transversely to the rotatable shaft 17 of a stepper motor 7. This vane lies in the plane of the center axis of this shaft and projects radially therefrom sufficiently to completely intercept the light beam when at right angles to the axis of said beam. This is the closed position of the shutter, which is shown in dotted lines in FIG. 1. When the shutter vane is rotated through 90° to its position 5a, shown in solid lines, the light beam is totally unobstructed and the shutter is open. The vane should be made of a non-corrosive metal or ceramic material of low emissivity at least on the side toward the lamp, and it should have low thermal conductivity since it, when in the closed position, intercepts the high energy emitted by the light source, which may reach a temperature of several hundred degrees centigrade. Low surface emissivity on the lamp side will serve to minimize heating the source by reemitted energy. Emission from the obverse side of the vane will be mostly in the infrared region and, as a result, will not be destructive to the optical surfaces. We have found stainless steel to be a suitable material for the shutter vane. Its low thermal conductivity minimizes heating of the stepper motor through the motor shaft. The motor used in this embodiment is an Airpax Unipolar stepper motor, 15 degrees per step, 6 V excitation.

When the shutter is open, as indicated at 5a, the light beam enters the excitation monochromator 6 through entrance slit 4, is dispersed by a grating or prism in a manner well known in the art and concentrated on a sample 8 by a suitable condensing system 9. Fluorescence emitted by the sample as a result of irradiation by the excitation beam is directed to an emission monochromator and photometric system 10. The output signal therefrom is directed by a bus 11 to a microprocessor 12 for computational analysis. Other adjuncts such as a keyboard 14 also deliver commands to the microprocessor at the will of the operator, directing the computer to perform analytical routines on the output from the sample; make adjustments to the wavelengths selected by the monochromators; record results; and many other controlled operations. When any of these operations require the light beam to pass through the monochromator system and illuminate the sample, an activity signal is generated by the photometer circuitry or other means in the photometric system 10 for generating an electrical activity signal indicative that the photometric system is ready to provide photometric data. Such a signal is sent through bus 11 to the microprocessor. The microprocessor recognizes this signal as one of activity and directs a command to the shutter motor 7 through drive amplifier 16. This command comprises a series of pulses correct in number and phase to move the shutter from its closed position 5 to its open position 5a where it is halted by a mechanical stop 18. This stop must be located to correspond with the natural detenting action of the motor so as to avoid bounce. The shutter remains in the stopped position under the control of the shutter routine. Excitation is removed from the motor while stopped, since this motor has been chosen to be self detenting, thus reducing motor heating and permitting the motor to dissipate heat from the shutter without reaching excessive temperature.

Figure 2:
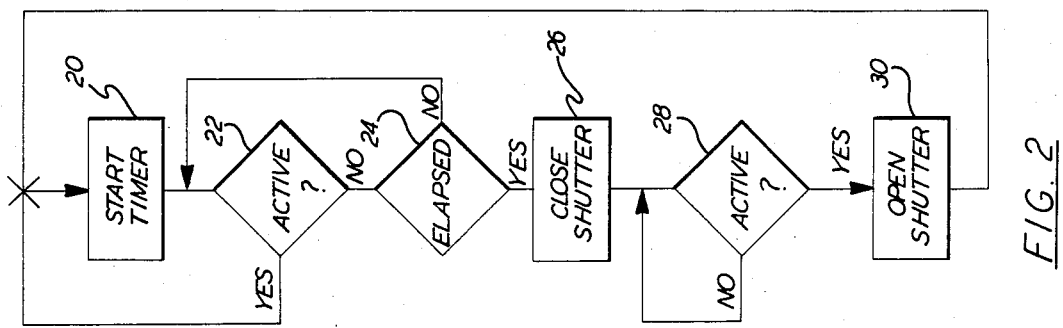
FIG. 2 is a simplified flow chart of the shutter routine.

The shutter routine may be understood by reference to FIG. 2 which shows a simplified flow chart thereof. This routine starts with the power-up of the instrument and continues until the instrument power is removed. Hence, the routine can be generated by a separate or dedicated microprocessor dependent only on an activity signal from the main computer calling for source excitation or it can be generated by the main computer through suitable interrupts. One skilled in the art can appreciate the flexibility of programming afforded by this option. In either case a direct command to open or close the shutter or lock it in either position through software override may interrupt the routine if introduced through the keyboard 14, FIG. 1. as an operator option or through the main computer as part of an auxiliary routine, for instance locking the shutter closed during a baseline correction procedure. The programming of the introduction of such a direct command into the routine to interrupt it and the subsequent return to routine should be understood by one skilled in the art.

Referring to FIG. 2, the timer in block 20 may be a resettable counter. At the start of the timing operation the timer is reset, started and activity is checked by decision block 22, the information coming from the main computer via a command calling for the use of the photometric system to supply data through bus 11, FIG. 1. If activity is present the shutter will be held in the open position until activity ceases as the loop including blocks 20 and 22 repeats. The timer then, when activity ceases, proceeds to the end of the set time interval and addresses decision block 24. While the illustrated embodiment utilizes approximately 2 minutes as the set time, this period is chosen primarily to span the shortest typical operation and may be otherwise established if so desired. In the illustrated embodiment counting is derived from cycles of the light chopper, which total 3840 in 2 minutes. When decision block 24 indicates that this number has been reached the operation to close the shutter, similar to that of opening but with the rotation of the motor reversed, is executed, block 26. The shutter will then remain closed until decision block 28 indicates on query that activity is again present whereupon the operation of opening the shutter, block 30, is initiated. When the shutter is open the routine returns to start and repeats.

It will be apparent to one skilled in the art that the program as cited above can be implemented in various ways and that variations as regards the software are possible. Also different versions of the hardware and in the construction of the shutter can be made while still retaining the operational concept and advantages of the invention. For this reason we do not wish to be limited to the particular embodiment described.

Although a certain particular embodiment of the invention has been herein disclosed for purposes of explanation, various modifications thereof, after study of this specification, will be apparent to those skilled in the art to which the invention pertains, and reference should accordingly be had to the appended claims in determining the scope of the invention.

What is claimed is:

1. A computer controlled radiation-protective shutter system for a spectrophotometer of the type having a high intensity radiation source disposed for projecting an optical beam onto optical elements thereof comprising:

shutter means for selectively alternately occluding and passing said optical beam onto said optical elements in response to actuation by a microprocessor means, said shutter means having a shutter element adapted to shield said optical elements from deleterious radiation from said radiation source when said shutter means is occluding said optical beam, microprocessor means for directing actuation of said shutter means to pass said optical beam in response to a test showing the presence of an activity signal signifying an operational condition of the associated spectrophotometer requiring the optical beam to be projected onto the optical elements and for allowing said shutter means to occlude said optical beam if said test shows said activity signal is not detected, said microprocessor means being electrically interconnected to said shutter means, means for generating an activity signal signifying any of a preselected plurality of operating conditions of the associated spectrophotometer requiring the optical beam to be projected on the optical elements, said generating means being interconnected to said microprocessor means, and a software routine directing said microprocessor means to enter a timed cycle of testing for the presence of said activity signal at preselected intervals, continuing said timed cycle as long as said presence of said activity signal is detected by said test, and allowing said timed cycle to terminate if said presence of said activity signal is not detected by said test.

2. The shutter system of claim 1 comprising timing means for providing a preselected delay between tests for the presence of an activity signal.

3. The shutter system of claim 1 comprising timing means for providing a preselected delay after a test shows the absence of an activity signal before said shutter means is allowed to occlude said optical beam.

4. The shutter system of claim 3 wherein said predetermined delay approximates the shortest typical operational period of an associated spectrophotometer.

5. The shutter system of claim 4 wherein said predetermined delay is not less than two minutes.

6. The shutter system of claim 1 which comprises means for automatically initiating said software routine upon powerup of the associated spectrophotometer.

7. The shutter system of claim 1 wherein said software routine is configured to be initiated by a direct command originating from keyboard actuation by an instrument operator.

8. The shutter system of claim 1 wherein the program of said software routine is eecuted entirely by said microprocessor means.

9. The shutter system of claim 1 wherein said microprocessor means includes a microprocessor dedicated for said routine.

10. The shutter system of claim 1 wherein the operation of said microprocessor means is independent from timing programs of an associated spectrophotometer.

11. The shutter system of claim 1 which comprises means for selectively locking said shutter means so as to occlude said optical beam and alternately to pass said optical beam.

* * * * *